United States Patent [19]

Kawada et al.

[11] 4,291,265

[45] Sep. 22, 1981

[54] PROTECTIVE SYSTEM FOR INVERTER CIRCUIT USED IN DRIVING AC MOTORS

[75] Inventors: Shigeki Kawada, Hino; Hiroshi Ishida, Hamura; Keiji Sakamoto, Hino, all of Japan

[73] Assignee: Fujitsu Fanuc Limited, Japan

[21] Appl. No.: 89,735

[22] Filed: Oct. 31, 1979

[30] Foreign Application Priority Data

Nov. 4, 1978 [JP] Japan .................. 53/136067

[51] Int. Cl.³ ............................................. H02P 5/40
[52] U.S. Cl. ...................................... 318/782; 318/802
[58] Field of Search ............... 318/782, 801, 802, 434; 363/56

[56] References Cited

U.S. PATENT DOCUMENTS

| | | | |
|---|---|---|---|
| 3,427,526 | 2/1969 | Kernick | 363/56 |
| 3,721,836 | 3/1973 | Rippel | 363/56 |
| 3,775,651 | 11/1973 | Graf et al. | 318/802 |
| 4,099,225 | 7/1978 | Nygaard | 363/56 |
| 4,151,418 | 9/1977 | O'Berto et al. | 363/56 |
| 4,162,524 | 7/1979 | Jansson | 363/56 |

*Primary Examiner*—David Smith, Jr.

*Attorney, Agent, or Firm*—Staas & Halsey

[57] ABSTRACT

The invention relates to a speed control system which includes an inverter circuit for converting a direct current into a polyphase alternating current in the form of a rectangular wave by the switching action of transistors, and an inverter drive circuit adapted to apply control signals to the inverter circuit to bring its output frequency to a desired value, an AC motor being rotated by the alternating current supplied by the inverter circuit. The system features current detection means for detecting the current that flows thrugh the input side of the inverter circuit, and a circuit adapted to terminate the operation of the inverter circuit when the value detected by the current means approaches a value large enough to damage the inverter circuit transistors as at such time that a large momentary current is subjected thereto. Also provided is protective circuitry with a current-limiting function adapted to suppress an increase in the output current of the inverter circuit and limit this current to a stable value without terminating the operation of the inverter circuit at such time that the current continuously flowing into the transistors of the inverter circuit is about to flow to its output side at an increased magnitude that could damage the transistors.

6 Claims, 3 Drawing Figures

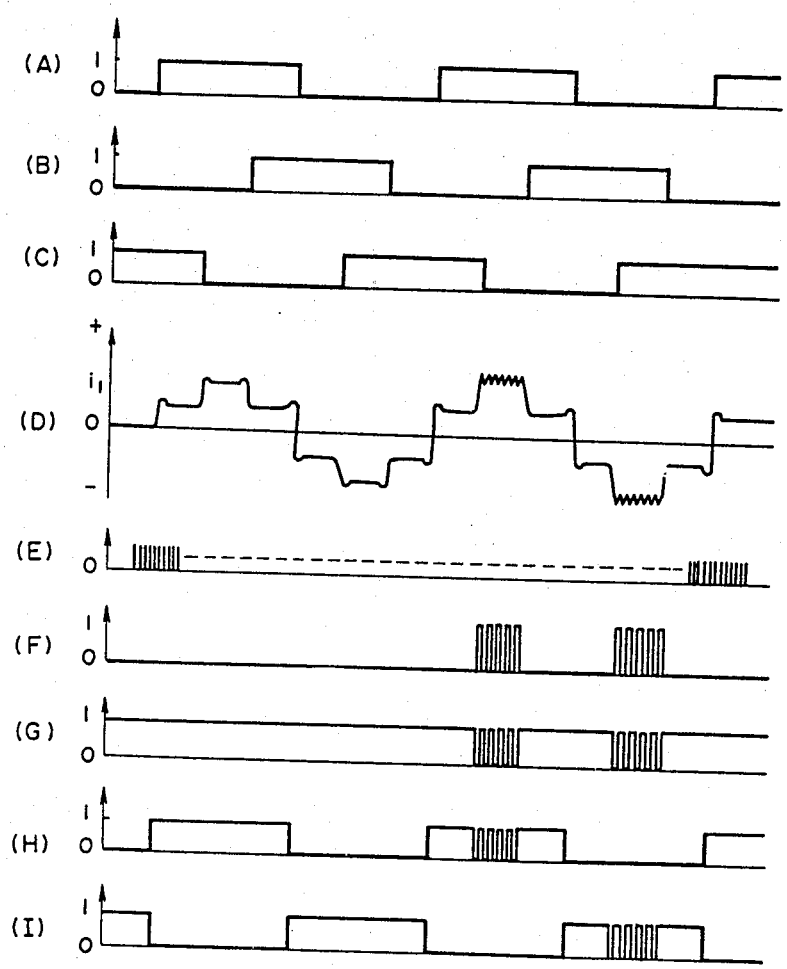

PROTECTIVE SYSTEM FOR INVERTER CIRCUIT USED IN DRIVING AC MOTORS

BACKGROUND OF THE INVENTION

This invention relates to a protective system for an inverter circuit employed in driving an AC motor.

DC motors have long been adopted for such uses as spindle motors in machine tools and crane motors, but in recent years this field has seen increasing application of AC motors, particularly of the induction type, owing to the fact that they can now be controlled in speed over a wide range in the same manner as the DC motors which they are gradually replacing.

The known AC motor speed control systems generally include an inverter circuit for converting a direct current into an alternating current, the direct current being supplied by a battery or obtained by rectifying a commercial three-phase AC power source, as well as an inverter drive circuit for varying the frequency of the alternating current delivered by the inverter circuit. This alternating current is then applied to an AC motor which can be rotated at the desired speed by varying the frequency of the alternating current at will.

In the inverter circuit the conversion of direct current to alternating current is accomplished by repeatedly switching thyristors on and off if the inverter circuit is of the thyristor type. However, one disadvantage of the inverter circuit that relies on thyristors is that it must be separately provided with a circuit to turn the thyristors off since the thyristors do not have the ability to perform this function themselves even if they can turn themselves on.

In recent years, high output power transistors capable of controlling motors in the several tens of kilowatt class have been developed, and this has in turn led to the development of AC motor speed control systems which employ inverter circuits composed of such high output power transistors. These inverter circuits are much simpler than those employing the thyristors since each power transistor is controlled merely by the application of a base signal which renders the transistor conductive or non-conductive. One problem encountered in this system is that the transistors are likely to break down if an electric current in excess of a fixed value which is decided by the transistors should flow through them, even momentarily. Moreover, if the current is lower in level than this fixed value but an overcurrent which exceeds the rated value should flow through the inverter circuit for a long period of time, the transistors will still be damaged. To prevent such damage it has been conventional practice to provide the speed control system with a protective circuit adapted to immediately terminate the function of the inverter circuit as soon as it is subjected to an overcurrent.

The disadvantage with this arrangement is that it diminishes working efficiency since a running machine tool or belt conveyor will be shut down whenever an operator commits a minor error that causes an overload. In other words, employing a transistor-type inverter circuit to control the AC motors in such machinery renders the machinery susceptible to shut-down every time an overload occurs.

SUMMARY OF THE INVENTION

It is an object of the present invention to provide a protective system adapted to prevent breakdown of transistors in an inverter circuit for driving an AC motor at such time that a momentary current large enough to cause breakdown flows into the inverter circuit.

It is another object of the present invention to provide a protective system which includes a protective circuit adapted to protect transistors against breakdown in an inverter circuit for driving an AC motor at such time that a momentary current large enough to cause breakdown flows into the inverter circuit, the protective circuit functioning to immediately terminate operation of the inverter circuit at the moment such current flows, and a protective circuit provided with a limiting function operable, at such time that a current flowing into a transistor is about to increase to an excessive magnitude due to an overload, to hold the magnitude of the current to a rated value without terminating the operation of the inverter circuit.

The novel features of the present invention are set forth in the appended claims, while other objects thereof will be apparent from an understanding of the following detailed description of a preferred embodiment. Numerous advantages not touched upon herein will also be readily apparent to those skilled in the art upon practicing the present invention.

DESCRIPTION OF THE DRAWINGS

FIG. 3 is a schematic diagram showing waveforms associated with various portions of the overcurrent protection device illustrated in FIG. 2.

DESCRIPTION OF THE PREFERRED EMBODIMENT

Figure 1:
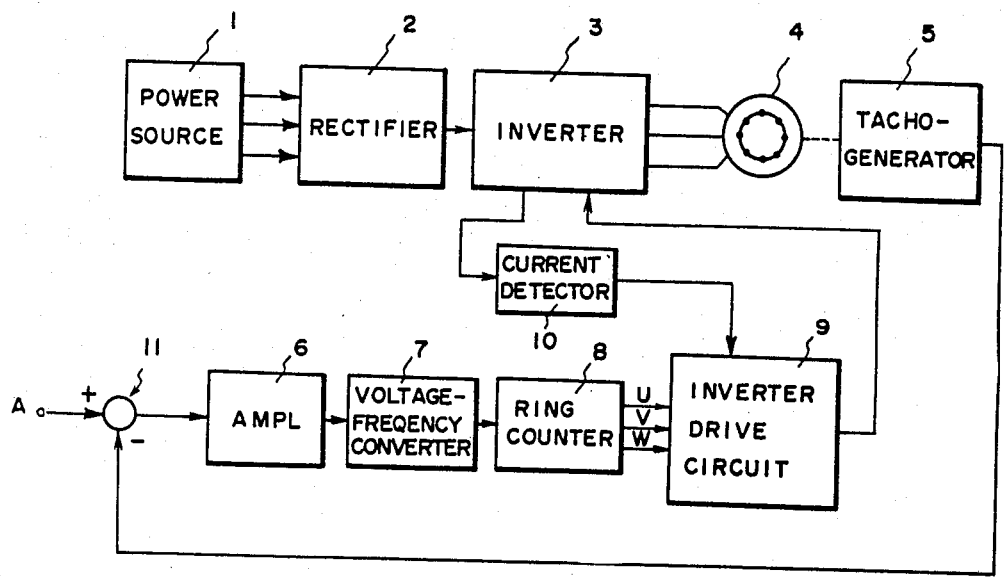
FIG. 1 is a functional block diagram of an embodiment in accordance with the present invention.

The functional block diagram of FIG. 1 illustrative of a control system for driving an induction motor comprises a three-phase commercial power source 1, rectifier circuit 2, an inverter circuit 3 that employs power transistors, an induction motor 4, tachometer generator 5, amplifier 6, voltage frequency converter (referred to hereinafter as a V-F converter) 7, three-phase ring counter 8, inverter drive circuit 9, and an overcurrent detection circuit 10. A speed instruction signal applied to an input terminal A is fed to the V-F converter 7 after being amplified in amplifier 6, the V-F converter producing a pulse signal output whose frequency is proportional to the voltage which appears on the output side of the amplifier 6. The three-phase ring counter 8 is operable to produce three rectangular voltage waves U, V and W successively displaced in phase by 120 degrees in response to the pulse signal delivered by the V-F converter 7. The inverter drive circuit 9 is in turn responsive to the three rectangular waves from three-phase ring counter 8 to produce a drive signal for controlling the groups of power transistors constituting the inverter circuit 3. The inverter circuit constitutes a three-phase rectangular wave power source. Specifically, the inverter circuit 3 is controlled by the inverter drive signal to produce three-phase rectangular waves by switching the transistors on and off to pass or interrupt the direct current delivered by the rectifier circuit 2, these outputs then being supplied to the induction motor 4. This three-phase power source rotates the induction motor whose speed is detected by the tachometer generator 5 adapted to apply feedback representative of motor speed to the input side of the system. Thereafter a closed loop comprising a control system functions to reduce to zero the output at a summing or mixing point 11, whereby the induction motor 4 is made to rotate at the instructed speed. If an excessive electric current flows into the inverter circuit 3, the overcurrent detection circuit 10 detects this fact and so informs inverter drive circuit 9 which responds to protect the inverter circuit 3 by either limiting or interrupting the current flowing through it.

Figure 2:
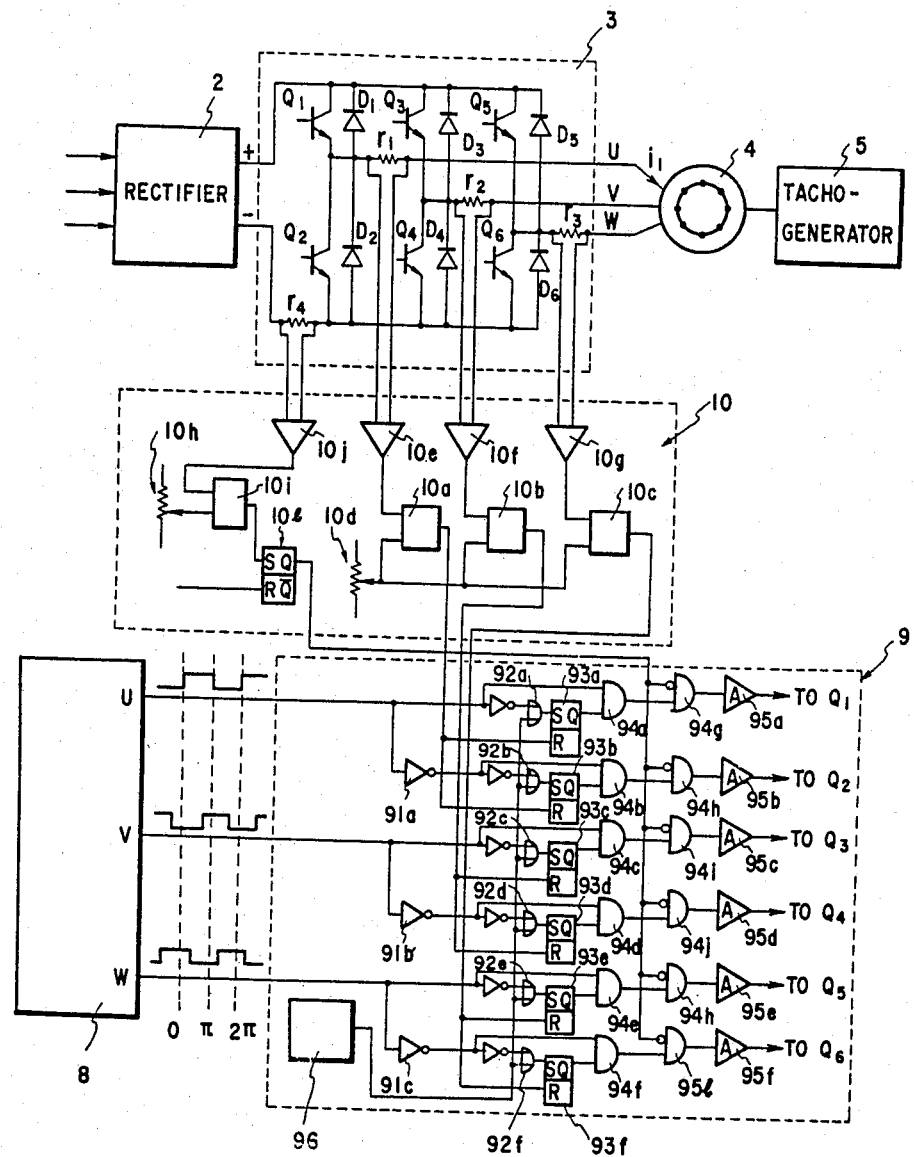
FIG. 2 is a detailed circuit diagram of an overcurrent protection device in accordance with the present invention.

The device for protecting against this overcurrent is shown in FIG. 2 which illustrates the circuit in concrete form. The inverter circuit 3 includes power transistors $Q_1$ through $Q_6$ and free wheeling diodes $D_1$ through $D_6$, as well as overcurrent detection resistors $r_1$, $r_2$, $r_3$ inserted between the respective U, V and W phase outputs and the induction motor 4, and an overcurrent detection resistor $r_4$ inserted in the d.c. line leading to the rectifier 2. Comparators 10a, 10b, 10c included in overcurrent detection circuit 10 have one input terminal connected to an overcurrent value setting device 10h and their other input terminal to both sides of respective resistors $r_1$, $r_2$, $r_3$ through isolation amplifiers 10e, 10f, 10g, respectively. Another comparator 10i has one input terminal connected to an overcurrent value setting device 10h and its other input terminal to both sides of resistor $r_4$ through an isolation amplifier 10j. The output of comparator 10i is in turn connected to a latch circuit 10l. Inverter drive circuit 9 comprises three inverters 91a, 91b, 91c, six OR gates 92a through 92f, six flip-flops (referred to hereinafter as FF) 93a through 93f, 12 AND gates 94a through 94l, six amplifiers 95a through 95f, and a pulse generator 96. The oscillation frequency of pulse generator 96 is set to be sufficiently greater than the frequency of the rectangular waves delivered by the three-phase ring counter 8 or, more specifically, several tens of times higher than the maximum frequency of the variable rectangular waves.

The power transistors $Q_1$ through $Q_6$ constituting inverter circuit 3 are protected from overcurrents through the following operation.

Under normal conditions the output Q of latch circuit 10l in overcurrent detection circuit 10 is at logic "0", so that the AND gates 94g through 94l in inverter drive circuit 9 are all open. Meanwhile, the rectangular waves denoted by A, B and C in FIG. 3 are delivered to inverter drive circuit 9 from the respective U, V and W phase outputs of three-phase ring counter 8. Limiting the discussion to the phase U for simplicity, FF 93a is set when the rectangular wave for this phase goes to logic "0" to send a corresponding signal through the OR gate 92a. The output Q of FF 93a therefore goes to logic "1" and AND gate 94a is opened. When the rectangular wave undergoes a reversal and goes to logic "1", a corresponding "1" signal passes through the open AND gate 94a and then through the following AND gate 94g. This signal upon passing through AND gate 94g is amplified by amplifier 95a and then applied to power transistor $Q_1$ to turn the transistor on. When the rectangular wave again returns to logic "0", AND gate 94a is closed and this results in the turn-off of power transistor $Q_1$.

The circuitry which includes the amplifier 95b has the inverter 91a inserted between its input side and the U-phase line and therefore produces an output signal delayed in phase by 180 degrees with respect to the output of amplifier 95a. Thus, when power transistor $Q_1$ is turned on, power transistor $Q_2$ is turned off. Conversely, when power transistor $Q_1$ is turned off, power transistor $Q_2$ is turned on.

The aforesaid operation also takes place in the case of the V and W phases as well, with power transistors $Q_3$ and $Q_4$ being alternately turned on and off in repetitive fashion, as well as the power transistors $Q_5$ and $Q_6$. Switching these power transistors on and off in combination produces three-phase voltage waves that drive the induction motor 4. When the induction motor 4 is running normally, a current $i_1$, illustrated by the first half of the waveform D in FIG. 3, flows through the U-phase line chosen to serve as an example.

If the induction motor 4 should be subjected to a heavy load and an overcurrent begin to flow in a line of the inverter circuit 3 such as the U-phase line, there will be a large increase in the voltage developed across the resistor $r_1$ connected to the output side of the inverter circuit, and the output of comparator 10a will go to logic "1" if the voltage exceeds a value which has been set by the overcurrent value setting device 10d. The "1" signal resets FF 93a and FF 93b, with the result that AND gates 94a, 94b are closed and power transistors $Q_1$ and $Q_2$ turned off. This operation protects the power transistors from the overcurrent and simultaneously returns the output of window comparator 10a to logic "0".

On the other hand, pulse generator 96 is constantly supplying the pulses shown in FIG. 3E to the OR gates 92a through 92f. Hence, immediately after FF 93a and FF 93b are reset they receive these pulses through the OR gates 92a and 92b and are instantly set thereby. When this occurs the power transistors $Q_1$ and $Q_2$ are turned on or enabled as described above and hence begin to conduct in order to drive the motor. However, if the problem such as the circuit overload is still present and the current $i_1$ flowing through resistor $r_1$ attempts to attain an excessive value, the transistor protecting operation described above is restored to once again disable power transistors $Q_1$ and $Q_2$ and hence protect them. The FF's 93a, 93b are reset and then immediately set again by the arrival of the pulses from pulse generator 96. This operation continues until the circuitry returns to a normal running condition wherein the size of the current flowing through resistor $r_1$ diminishes to an acceptably small value. If this is the case, power transistors $Q_1$ and $Q_2$ are permitted to continue switching normally to produce the desired rectangular wave.

FIG. 3F illustrates the output wave form from window comparator 10a when the comparator functions as described above, FIG. 3G and Q output waveforms from FF 93a and FF 93b, FIG. 3H the output waveform from AND gate 94a, and FIG. 3I the output waveform from AND gate 94b.

It should be noted that utilizing the comparators in the overcurrent detection circuit 10 allows the overcurrent to be detected regardless of the direction in which current flows through the resistor $r_1$. Moreover, the transistor protecting operation is performed in a similar manner in the drive systems of power transistors $Q_3$, $Q_4$ and $Q_5$, $Q_6$. It should further be noted that the overcurrent value setting device 10d is set to the maximum value of the current that can continuously flow through the power transistors which constitute the inverter circuit.

The protective system of the present invention is also effective in protecting the power transistors of the inverter circuit from the direct current supplied by the rectifier circuit 2 even if the current becomes excessive, and hence potentially damaging, only momentarily. This protective operation will now be described.

It will be assumed that the overcurrent setting device 10h of the overcurrent detection circuit 10 has been set to the maximum rated value of the power transistors, that is, to a value which corresponds to the maximum current that can flow into the power transistors. By way of example, let it be assumed that the three-phase commercial power source 1 introduces a surge voltage that causes a sudden increase in the output voltage of rectifier circuit 2 which will in turn start to increase the direct current flowing into the input side of inverter circuit 3. This increasing current will thus raise the voltage developed across resistor $r_4$. The output of comparator 10i will go to logic "1" if the voltage across resistor $r_4$ exceeds the value set by overcurrent detection circuit 10h, and the "1" signal will set latch circuit 10l whose Q output will be latched to logic "1". This will close all of the AND gates 94g through 94l, with the result that all of the drive signals for driving the power transistors $Q_1$ through $Q_6$ in inverter circuit 3 will be interrupted. This will disable all the power transistors and protect them from the excessive current.

The present invention is not limited to the foregoing embodiment but can also be applied to a control device for a so-called variable voltage-variable frequency drive system by making use of a pulse width control device to vary the width of voltage pulses, namely pulses obtained by finely dividing the voltage applied to an induction motor, in proportion to an instructed motor speed applied to the induction motor control system.

It is also to be noted that the speed control system is not limited to that of the above embodiment but that any well-known speed control system can be utilized that is suited to the type of AC motor employed or the use thereof.

The present invention as described herein thus protects an inverter circuit by suppressing an excessive increase in the current flowing therethrough without terminating the operation of the inverter circuit even when the current has begun to gradually increase owing to an AC motor overload. On the other hand, full protection of the inverter circuit power transistors is assured by terminating operation of the entire inverter circuit if by some chance it should be exposed to a steep, momentary current increase large enough to damage the power transistors.

As many apparently widely different embodiments of the present invention may be made without departing from the spirit and scope thereof, it is to be understood that the invention is not limited to the specific embodiments thereof except as defined in the appended claims.

What we claim is:

1. In a protective system for an inverter circuit used in driving an AC motor, which system includes an inverter circuit for converting a direct current into a three-phase alternating current in the form of a rectangular wave by the switching action of transistors, three-phase rectangular signal generating means for generating a three-phase rectangular signal of a frequency in accordance with a deviation between an instructed speed and an actual speed, and an inverter drive circuit which receives the three-phase rectangular signal to regulate the output frequency of the inverter circuit to a prescribed value, the AC motor being made to rotate by the alternating current supplied by the inverter circuit, the improvement comprising:

first current detection means for detecting a maximum rated current flowing through the transistors which constitute the inverter circuit, the operation of the inverter circuit being terminated when said first current detection means responds upon detecting the maximum rated current; and second detection means, provided for each of the three phases, for detecting a fixed overcurrent value in each of the three phases, which overcurrent value is less than the value of the maximum rated current, wherein when said second current detection means for a given one of the three phases responds upon detecting the fixed overcurrent value, only that transistor in the inverter circuit corresponding to said given phase is switched on and off at a fixed period to chop only the primary voltage of said given phase, whereby the current flowing through the transistor corresponding to said given phase is limited to a value which is less than the fixed overcurrent value.

2. A protective system according to claim 1, wherein the first current detection means is provided on the input side of the inverter circuit, and the second current detection means is provided on the output side of the inverter circuit.

3. A protective system according to claim 1, wherein the first current detection means includes:

an overcurrent value setting device;

a comparator for making a comparison between an output voltage developed by said overcurrent value setting device and a voltage proportional to the current which passes through the input side of the inverter circuit; and a flip-flop circuit set by an output signal delivered by said comparator.

4. A protective system according to claim 1, wherein the second current detection means includes:

an overcurrent value setting device, and a comparator for making a comparison between an output voltage produced by said overcurrent value setting device and a voltage proportional to the current flowing through the output side of the inverter circuit.

5. A protective system according to claim 1, wherein the inverter circuit is provided on its input side with a first gating circuit, a second gating circuit one input of which is connected to the output of said first gating circuit, and setting means for repeatedly opening said first gating circuit after said first gating circuit has been closed, said second gating circuit being controlled by an output signal from the first current detection means, and said first gating circuit being controlled by an output signal from the second current detection means.

6. A protective system according to claim 5, wherein the first gating circuit and second gating circuit are composed of AND gates, and the setting means for repeatedly opening the first gating circuit is composed of a pulse generator and a flip-flop in combination.

* * * * *